United States Patent Office 3,496,198
Patented Feb. 17, 1970

---

3,496,198
PROCESS FOR THE PREPARATION OF 3-HY-
DROXY-17-KETOSTEROID-3,5,7-TRIENES
Gunther Kruger, Surendra N. Sehgal, and Claude Vezina, Montreal, Quebec, Canada, assignors to American Home Products Corporation, New York, N.Y., a corporation of Delaware
No Drawing. Filed Mar. 20, 1967, Ser. No. 624,169
Int. Cl. C07c *169/22, 167/12;* C12d *13/00*
U.S. Cl. 260—397.4                         6 Claims

ABSTRACT OF THE DISCLOSURE

There is disclosed herein a process for preparing 3-hydroxyestra - 3,5,7 - trien-17-one and 3,19-dihydroxy-androsta - 3,5,7-trien-17-one, and for converting those compounds to equilin by microbiological means.

---

The present invention relates to a process for preparing 3 - hydroxy - 17 - ketosteroid - 3,5,7 - trienes which may be converted to equilin, a potent naturally occurring estrogen by microbiological means.

More particularly, the present invention relates to a process for preparing steroidal enols represents by Formula I:

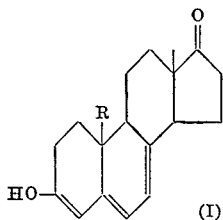

R represents hydrogen or a hydroxymethyl group. These enols are useful intermediates for the synthesis of equilin, an important estrogenic hormone; said intermediates may be prepared by the process of this invention more advantageously than the intermediates for preparing equilin described in the literature.

There is, for example, a process for the preparation of the steroidal enol acetate, 3-acetoxyestra-3,5,7-triene-17-one used for the preparation of equilin, and described by D. A. Irvine et al., U.S. Patent No. 3,272,848, and by J. F. Bagli, P. F. Morand, K. Wiesner, and R. Gaudry in Tetrahedron Letters 387 (1964), whereby a solution of estra-4,6-diene-3,17-dione in acetic anhydride, acetyl chloride and pyridine is boiled for a period of 2¼ hours. It is a particular advantage of the process of this invention that the preparation of the enols, 3 - hydroxyestra-3,5,7-trien-17-one, and 3,19 - dihydroxyandrosta-3,5,7-trien-17-one is achieved by much milder conditions and in a much shorter reaction time.

It is another advantage of the process of this invention that it permits obtention of Δ⁷-19-norsteroids from the easily available Δ₄,₆-ketosteroids-19-aldehydes and 19-carboxylic acids in a more efficient manner than known herefore.

The preferred starting materials for the process of this invention are represented by Formula II,

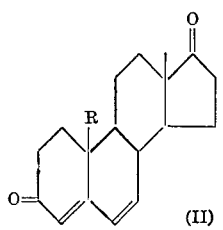

in which R represents hydrogen, formyl, carboxyl or hydroxymethyl.

In a preferred embodiment of this invention estra-4,6-diene-3,17-dione (II, R'=H), prepared as described by K. Heusler, J. Kalvoda, Ch. Meystre, H. Ueberwasser, P. Wieland, G. Anner, and A. Wettstein, Experientia 18, 464 (1962), or in U.S. Patent No. 3,272,847, is treated with 0.1 to 80 parts, preferably 7.5 parts, or an alkali metal alkoxide of lower alkanols, such as, for example, potassium t-butoxide or preferably sodium methoxide, or alkali metal hydroxide, such as, for example, potassium hydroxide, or sodium hydroxide, or an alkali metal hydride such as, for example, sodium hydride, in dimethyl sulfoxide solution, or by using a previously prepared solution of methylsulfinyl anion in dimethylsulfoxide prepared according to Corey and Chaykovsky, J. Am. Chem. Soc., 84, 866 (1962), with or without inert solvent such as ether, benzene, or tetrahydrofuran, preferably in a nitrogen atmosphere for a period of 10 seconds to one hour, preferably 3 minutes, at temperatures ranging from −20° C. to +60° C., with preference to the 0°–20° C. range. Subsequent treatment of the reaction mixture with an excess of an aqueous solution of a weak acid such as, for example acetic acid, or boric acid. The ratio of the acid to water should be lower than 2:1 and preferably 1:10 to 1:20. The acidification is carried out at temperatures from the freezing point of an aqueous acid to room temperature, preferably at the freezing point of the aqueous acid and with a minimum of delay, to yield, the desired enol, 3-hydroxyestra-3,5,7-trien-17-one, which precipitates and may be isolated by filtration and purified by tituration with water or aqueous ethanol.

In the same manner, but by replacing estra-4,6-diene-3,17-dione with either 3,17-dioxoandrosta-4,6-dien-19-al, (II, R=CHO), described by K. Heusler et al. Experientia, 18, 464 (1962), or with 3,17-dioxoandrosta-4,6,-dien-19-oic acid (II, R=COOH) described in U.S. Patent No. 3,250,792, and by proceeding as above, 3-hydroxyestra-3,5,7-trien-17-one is obtained.

Again in the same manner, but by replacing estra-4,6-diene-3,17-dione with 19-hydroxyandrosta-4,6-dien-3,17-dione (II, R'=CH₂OH), described by Heusler et al. Experientia, 18, 464 (1962), and by proceeding as above, the corresponding enol, 3,19-dihydroxyandrosta-3,5,7-trien-17-one is obtained. It is indeed surprising and unexpected that the free enols may be obtained and isolated by the process of this invention.

The above two enols may be converted directly to equilin by the microbiological transformations described below.

By exposing the novel enols of this invention to the activity obtainable in a suitable medium inoculated with microorganisms from the species Nocardia, such as, for example, *N. rubra* NRR1 B-685; *N. corallina* ATCC 999, ATCC 13,258 and ATCC 13,259; *N. restrictus* ATCC 14887; *N. asteroides* ATCC 6846, ATCC 9970, and 10,904; *N. canicruria* ATCC 17,896; *N. erythropolis* ATCC 17,895; *N. opaca* ATCC 4276; and *N. convoluta* ATCC 4275; *Arthrobacter simplex* ATCC 13,260; Arthrobacter species ATCC 19,140; *Corynebacterium simplex* ATCC 6946; Mycobacterium, such as, for example, *M. rhodochrous* ATCC 4273, and ATCC 9356; or *M. fortuitum* ATCC 6841, equilin is obtained. This may be accomplished by exposing the novel enol to the enzymatic activity obtainable from a growing culture or from the resting cells of the microorganism.

The following examples will illustrate this invention.

EXAMPLE 1

3-hydroxyestra-3,5,7-trien-17-one

Sodium methoxide (5.0 g.) is added in one portion to a suspension of finely divided estra-4,6-diene-3,17-dione (5.0 g) in dimethylsulfoxide (25 ml.) cooled to 18° C. The mixture is stirred at room temperature under nitrogen for three minutes and then poured into a partially frozen mixture of acetic acid-water (1:1; 100 ml.). The mixture is stirred under nitrogen for 10 minutes in an ice bath whereupon water (450 ml.), cooled to 0°, is added. After five minutes of further stirring the mixture is filtered, washed well with water and dried at room temperature for 16 hours at 1 mm. Hg pressure yielding the title compound which is digested with methanol; M.P. 103–111 and 116–117.5° C. (double melting point, evacuated tube; decomposition);

$\nu_{max.}^{Nujol}$ 3331, 1730, 1655, 1575, cm.$^{-1}$ $\lambda_{max.}^{MeOH}$ λ 320 mμ (ε 15,370)

also identified by NMR spectrography.

In the same manner, but using as starting materials 3,7-dioxoandrosta-4,6-dien-19-al or 3,17-dioxoandrosta-4,6-dien-19-oic acid, the title compound is also obtained, except that it is preferable to carry out the treatment with sodium methoxide at 60° C. when using the latter starting material.

EXAMPLE 2

3,19-dihydroxyandrosta-3,5,7-trien-17-one

Sodium methoxide (1.0 g.) is added in one portion to a solution of 19-hydroxyandrosta-4,6-diene-3,17-dione (1.0 g.) in dimethylsulfoxide (5.0 ml.). The mixture is stirred at room temperature for three minutes under nitrogen and poured into partially frozen acetic acid-water (1:9; 100 ml.). The mixture is stirred for 10 minutes in an ice bath, filtered and washed well with water. Drying at room temperature and high vacuum yields the title compound; M.P. 90–95 and 199–206° C. (double melting point; evacuated tube; decomposition)

$\lambda_{max.}^{MeOH}$ 380 mμ; $\nu_{max.}^{Nujol}$ 3380 cm$^{-1}$

EXAMPLE 3

Equilin

A culture of Nocardia rubra NRRL B-685 from an agar slant is used to inoculate a sterile nutrient broth (50 ml.), beef extract:peptone (3:5) in a 250 ml. Erlenmeyer flask. After a 24 hour incubation period a solution of progesterone (0.5 ml. concentration=10 mg./ml. of acetone) is added and the incubation is continued for another 24 hours. At that time 3-hydroxyestra-3,5,7-trien-17-one (5 mg.) in acetone (0.5 ml.) is added to the growing culture. After another 24 hour incubation period the contents of the fermentation flask are extracted twice with ethyl acetate:benzene (1:4). The organic extract is dried over sodium sulfate, filtered, and evaporated to dryness under reduced pressure. Equilin, identical with an authentic sample, is isolated and identified by gas liquid chromatography as the main product of the reaction.

In the same manner but replacing Nocardia rubra NRRL B-685 with microorganisms from other species of Nocardia, such as, for example, N. corallina ATCC 999, ATCC 13,258, and ATCC 13,259; N. restrictus ATCC 14,887; N. asteroides ATCC 6846, ATCC 9970 and 10,904; N. canicruria ATCC 17,896; N. erythropolis ATCC 17, 895; N. opaca ATCC 4276; and N. convoluta ATCC 4275; or with microorganisms from such as Arthrobacter simplex ATCC 13,260; Arthrobacter species ATCC 19,140; Corynebacterium simplex ATCC 6946; Mycobacterium, such as, for example, M. rhodochrous, ATCC 4273, and ATCC 9356; or M. fortuitum ATCC 6841; equilin is also obtained.

Again in the same manner but by substituting an equivalent amount of 3,19-dihydroxyandrosta-3,5,7-trien-17-one and using any of the microorganisms mentioned above, equilin is obtained.

We claim:
1. The process of preparing a steroidal enol of the formula

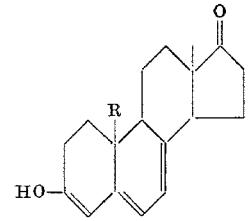

wherein R is selected from the group consisting of hydrogen and hydroxymethyl which comprises treating as starting material a compound of the formula

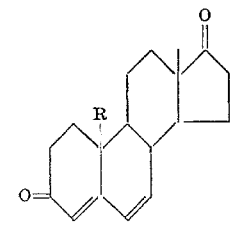

R being as above defined, with a base selected from the group which consists of alkali metal alkoxides of lower alkanols, alkali metal hydroxides, alkali metal hydrides and a solution containing methylsulfinyl anion, said treatment being carried out at a temperature within the range −20° to 60° C.; and treating the reaction mixture with an excess of an aqueous solution of a weak acid at a temperature ranging from that corresponding to the freezing point of the aqueous acid solution to room temperature.

2. The process as claimed in claim 1 wherein the starting material is estra-4,6-diene-3,17-dione and the steroidal enol prepared is 3-hydroxyestra-3,5,7-trien-17-one.

3. The process as claimed in claim 1 wherein the starting material is 3,17-dioxoandrosta-4,6-dien-19-al and the steroidal enol prepared is 3-hydroxyestra-3,5,7-trien-17-one.

4. The process as claimed in claim 1 wherein the starting material is 3,17-dioxoandrosta-4,6-dien-19-oic acid and the steroidal enol prepared is 3-hydroxyestra-3,5,7-trien-17-one.

5. The process as claimed in claim 1 wherein the starting material is 19-hydroxyandrosta-4,6-diene-3,17-dione and the steroidal enol prepared is 3,19-dihydroxyandrosta-3,5,7-trien-17-one.

6. The process as claimed in claim 1 wherein said treatment with a base is carried out at a temperature within the range 0° to 20° C., and said treatment with excess of an aqueous solution of a weak acid rapidly carried out at a temperaure corresponding to the freezing point of the aqueous acid solution utilized.

References Cited

UNITED STATES PATENTS

| | | | |
|---|---|---|---|
| 3,344,156 | 9/1967 | Bagli et al. | 260—397.4 |
| 3,346,603 | 10/1967 | Lefebore et al. | 260—397.4 |
| 3,272,848 | 9/1966 | Irvine et al. | 260—397.3 |

ELBERT L. ROBERTS, Primary Examiner

U.S. Cl. X.R.

195—51